(12) United States Patent
Chen et al.

(10) Patent No.: US 9,087,158 B2
(45) Date of Patent: *Jul. 21, 2015

(54) EXPLICIT CONTROL MESSAGE SIGNALING

(75) Inventors: Huimin Chen, Portland, OR (US); Kok Hong Chan, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 13/539,375

(22) Filed: Jun. 30, 2012

(65) Prior Publication Data

US 2014/0003473 A1 Jan. 2, 2014

(51) Int. Cl.
*H04B 3/00* (2006.01)
*G06F 13/38* (2006.01)

(52) U.S. Cl.
CPC .................................. *G06F 13/385* (2013.01)

(58) Field of Classification Search
CPC ............. H04B 2203/5483; H04B 3/56; H04B 2203/5491; H04B 3/542; H04L 25/0266; G06F 13/4068; G06F 13/385; G06F 9/4411; G06F 13/387; G06F 13/4086
USPC ................ 375/257, 222; 710/16, 17
See application file for complete search history.

(56) References Cited

U.S. PATENT DOCUMENTS

| | | | |
|---|---|---|---|
| 6,279,060 B1 | 8/2001 | Luke et al. | |
| 6,991,173 B2 * | 1/2006 | Fruhauf | 235/492 |
| 7,225,288 B2 | 5/2007 | Schulze et al. | |
| 7,870,319 B2 * | 1/2011 | Croyle et al. | 710/105 |
| 2004/0148539 A1 | 7/2004 | Leydier et al. | |
| 2009/0327774 A1 | 12/2009 | Jeyaseelan et al. | |
| 2010/0257391 A1 * | 10/2010 | Dring et al. | 713/323 |
| 2012/0059964 A1 * | 3/2012 | Foster | 710/300 |
| 2012/0059965 A1 * | 3/2012 | Foster | 710/305 |
| 2014/0006662 A1 | 1/2014 | Chen et al. | |

FOREIGN PATENT DOCUMENTS

JP 2001-160816 A 6/2001
WO 2014/004903 A1 1/2014

OTHER PUBLICATIONS

Universal Serial Bus Specification , Revision 2.0, Apr. 27, 2000.*
International Search Report and Written Opinion received for PCT Patent Application No. PCT/US2013/048313 , mailed on Oct. 15, 2013, 9 pages.

* cited by examiner

*Primary Examiner* — Dhaval Patel
(74) *Attorney, Agent, or Firm* — International IP Law Group, P.L.L.C.

(57) ABSTRACT

A method for explicit control message signaling includes sending a single ended 1 signal on a pair of data lines, wherein the pair of data lines includes a first data line and a second data line. A voltage of the first data line is driven to a logic 1, while pulsing the voltage of the second data line between a logic 1 and a logic 0, wherein the pulses represent a control message.

16 Claims, 4 Drawing Sheets

300

400

EXPLICIT CONTROL MESSAGE SIGNALING

BACKGROUND

The methods and systems disclosed herein relate to an explicit control messaging protocol. More specifically, a low-cost and low-power explicit control signaling for Universal Serial Bus 2.0 (USB2) and similar protocols is disclosed.

In its present state, USB2 utilizes the Link Power Management (LPM) system to issue control messages. This system defines an implicit signaling mechanism for the host to issue a control message (such as Suspend or Reset) based on the duration of a link idle time, or a control transfer for entry to L1.

DESCRIPTION OF THE EMBODIMENTS

According to embodiments of the subject matter disclosed in this application, a pair of single-ended logic '1' signals (SE1) is used during eUSB2 operations to issue control messages. eUSB2 is a new input/output (I/O) solution that reduces the voltage cost and power consumption of USB 2.0 interfaces. eUSB2 uses 1.0 Volt (V) digital signaling rather than the 3.3 Volt analog signal in USB 2.0 Low-Speed (LS) and Full-Speed (FS) operations. Additionally, eUSB2 uses a 0.2 V differential signaling instead of the 0.4 V differential signaling for USB 2 High-Speed (HS) interfaces. Due to the differences in the signal strength of USB2 and eUSB2, an eUSB2 repeater may be used as an electrical bridging solution to ensure that these two USB2 and eUSB2 are compatible with one another.

The standard USB2 employs two distinct methods to deliver a control message from a Host to a device for Reset (to reset a device) or L1/Suspend (to send the link and/or a device to a low power state). In transmitting Reset or Suspend, USB2 used implicit signaling measured by the duration of link in idle represented by SE0. In sending a link to L1, a control transfer is employed. Thus, the control messages in standard USB2 need to be detected by a device either using a timer to measure the duration of link idle, or decoding a control transfer.

As described above, a repeater may be used to ensure compatibility between the conventional USB2 solution and the eUSB2 solution. However, the repeater used with the eUSB2 solution may neither have a timer to measure the duration of link idle to discern Reset or Suspend, nor have the capability to decode a control transfer denoting L1 entry. Accordingly, embodiments described herein include explicit control message signaling. In embodiments, the signaling mechanism enables low power consumption and low cost implementation such that a host can explicitly send a control message in both active and idle states. Additionally, this signaling mechanism may be used for standard and modified USB2 implementations, eUSB2, as well as any instance where explicit control messages can be used.

Figure 1:
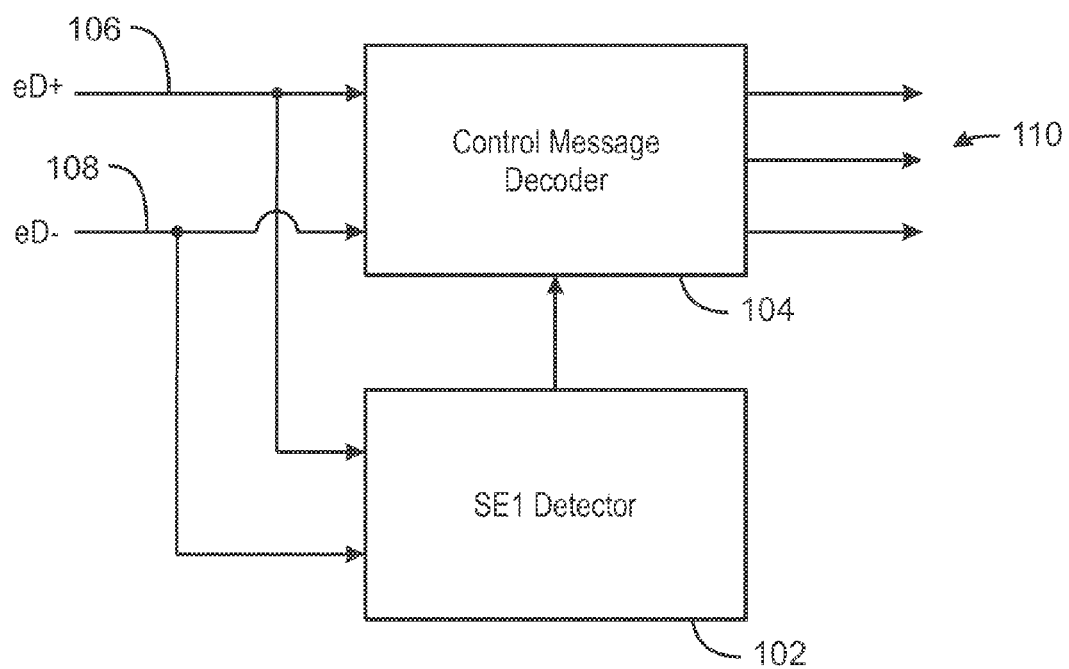
FIG. 1 is a block diagram of an apparatus configured to detect and decode an explicit control message.

FIG. 1 is a block diagram of an apparatus configured to detect and decode an explicit control message. The apparatus 100 may include an SE1 detector 102 and a control message decoder 104 connected by data lines eD+ 106 and eD− 108. The data lines are used to transmit signals between an upstream port and a downstream port. Depending on the particular operating mode, a physical layer (PHY) is configured to transmit data on the data lines eD+ 106 and eD− 108 using differential signaling, single ended digital communications, or some combination thereof. For example, while operating in high speed, differential signaling may be used to transmit data, while single-ended digital communications may be used to transmit control signals. While operating in low speed or full speed, single-ended digital communications may be used to transmit data and control signals. Thus, the data lines eD+ 106 and eD− 108 may serve as a channel for a transmission from an eUSB2 host port.

Logic '1', as referred to herein, describes a condition of a data line eD+ 106 or eD− 108 in which a voltage across the data line is relatively high when compared with other conditions of the data line. Logic '0', as referred to herein, describes a condition of a data line in which a voltage across the data line is relatively low when compared with other conditions of the data line. A single-ended 1 (SE1) signal, as referred to herein, describes a signal in which both data lines are at logic '1'. Additionally, a single-ended 0 (SE0) signal, as referred to herein, describes a signal in which both data lines are at logic '0'.

The SE1 detector 102 is capable of detecting an SE1 signal across data lines D+ 106 and D− 108. If an SE1 signal is detected, the SE1 detector may alert the control message decoder 104. The control message decoder 104 may interpret incoming transmission as an explicit control message. Once interpreted, the control message decoder 104 may deliver the control message to the intended device and the repeater itself. In this manner, the control message is explicitly conveyed by the SE1 signal across data lines D+ 106 and D− 108. In embodiments, previous link states or other conditions are not considered in order to determine the control message.

There are four Link Power Management (LPM) states used by USB2 protocols: L0, L1, and Suspend (or L2). The LPM states described the status of the bus line between an upstream port of a device and a downstream port of a host. The bus line may also be referred to as a link. Entry and exit into each of the LPM states can be performed using an implicit signaling mechanism based on the duration of link idle time to issue control messages such as Suspend and Reset, or control transfer for L1.

L0, as referred to herein, is an "On" state in which a link between a host and a device is enabled for communication. During this state, a port may be actively transmitting or receiving information through a pair of data lines D+ and D−, and is described as "active". Additionally, the port may have the ability to transmit or receive information through the pair of data lines, but is not currently doing so and is described as "idle". During the L0 state, the host is periodically transmitting Start-of-Frame (SOF) packets. If the device is operating at Low-Speed, or a data rate of 1.5 Mbit/s, the host can also periodically transmit "Keep Alive" control messages to prevent the link from entering the L2 state, described below. Reset, as referred to herein, is a control message that sets the device into an unconfigured, default state so that the host can communicate with the device. Resume, as referred to herein, is a control message that brings the device from a powered down state to L0. The powered down states include state L1 and state L2.

L1, as referred to herein, is a "Sleep" state in which the link is low power state to reduce power consumption. During this state, the link consumes approximately 600 μW of power, while the device power consumption is application specific. Entry to the L1 state is accomplished through a control transfer. Exit from the L1 state is accomplished through Resume.

L2, as referred to herein, is a "Suspend" state in which both the link and the device may enter the low power state to further reduce power consumption. During this state, the link consumes approximately 600 μW of power, while the device power consumption falls within a specified range. Entry to the L2 state occurs implicitly when no activity occurs on the link for 3 ms. Exit from the L2 state is accomplished through Resume.

Each of the L0 state, the L1 state, and the L2 state, is entered and exited using control messages. Traditionally, the entry and exit between the states is accomplished by either implicit signaling or a control transfer. However, for eUSB2, explicit control messages may be used to transition between the various link states.

Figure 2:
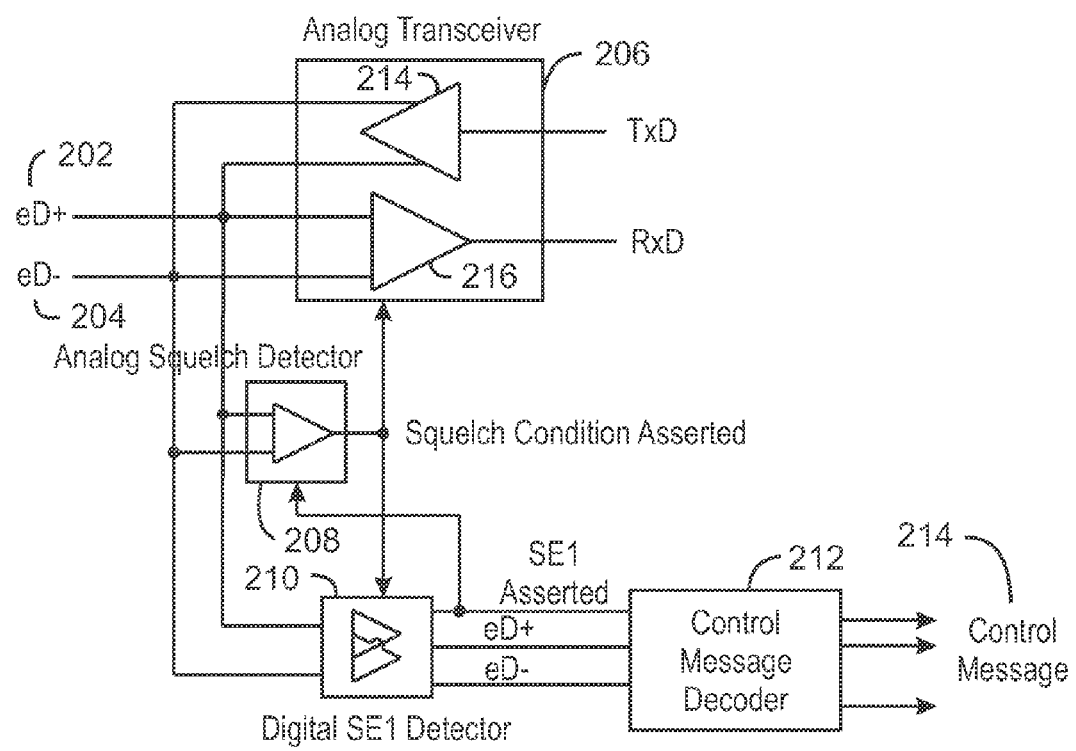
FIG. 2 is a schematic of a USB2 port that can detect and decode an explicit control message.

FIG. 2 is a schematic of a eUSB2 port that can detect and decode an explicit control message. In this embodiment, the eUSB2 port 200 is an upstream port (on a device), or a repeater that is in communication with a downstream port (on a host) via data lines eD+ 202 and eD− 204. The eUSB2 port may include a transceiver 206, a squelch detector 208, an SE1 detector 210, and a control message decoder 212.

The analog transceiver 206 is only employed during High-Speed operation. It may include a transmitter 214 and a receiver 216. For High-Speed communications during the L0 state, the receiver 216 may be disabled depending on the state of the squelch detector. If the squelch detector 208 detects that the link between the upstream port and downstream port is in squelched state, the receiver 216 may be disabled, and digital SE1 detector 210 is enabled in anticipation of a control message.

If the downstream port sends an SE1 signal, the SE1 detector 210 can recognize it, whereas a squelch detector remains in squelched condition because the voltage difference of SE1 between eD+ 202 and eD− 204 is zero, thus allowing digital communication while an analog squelch detector is enabled. Upon detecting SE1, the SE1 detector 210 forward a following control signal to the control message decoder 212, and at the same time disable the Analog transceiver 206. The control message decoder 212 can translate the signal into a control message 214 that may be executed by the device.

It is to be understood that the schematic of FIG. 2 does not indicate the only possible embodiment of a USB2 port that can detect and decode an explicit control message. Some embodiments may not include the squelch detector 208, as it may be unnecessary. Some embodiments may utilize pairs of digital transmitters and receivers in place of the single transmitter 214 and receiver 216. Furthermore, the explicit control signaling may be used in applications other than eUSB2 communications.

Figure 3:
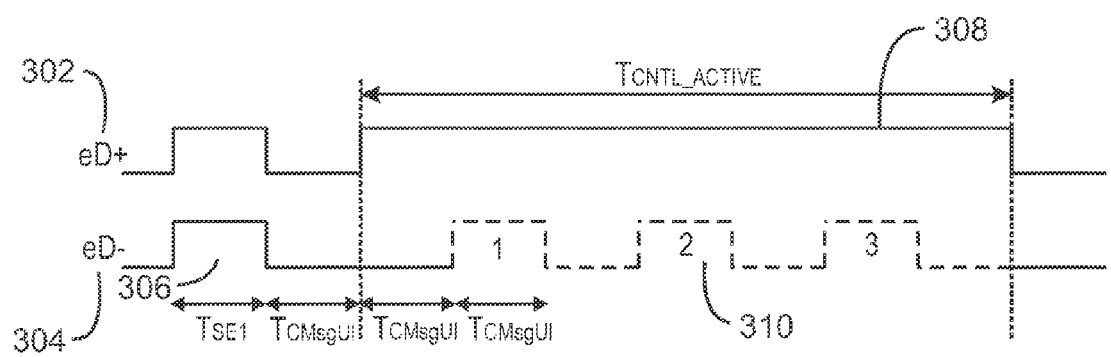
FIG. 3 is a timing diagram illustrating a sequence of an explicit control message.

FIG. 3 is a timing diagram illustrating a sequence of an explicit control message. The encoded control message 300 may be delivered over the data lines eD+ 302 and eD− 304 from the downstream port of a host to the upstream port of a device. In this embodiment, the encoded control message 300 begins with the downstream port driving an SE1 pulse 306 for a fixed period of time. Once detected by the upstream port, the SE1 pulse 306 may serve as a signal to the upstream port to anticipate an explicit control instruction.

Following the SE1 pulse 306, the downstream port drives both the eD+ and the eD− data lines to logic '0' for the duration of $T_{CMsgUI}$. $T_{CMsgUI}$ is a fixed interval of time that corresponds to a particular control signal. Following one interval of $T_{CMsgUI}$, the downstream port may drive the eD+ data line at logic '1' for a duration of time $T_{CNTL\_ACTIVE}$ known as an active window 308. During the active window 308, the downstream port may drive a number of pulses 310 on the eD− data line. Each pulse drives the eD− data line to a logic '1' for the fixed interval of $T_{CMsgUI}$. The number of pulses 310 that occur within the active window 308 may determine the nature of the control message being sent.

In FIG. 3, there are three pulses. In embodiments, three pulses during the active window 308 may represent a Resume message that wakes the device from Suspend or Sleep mode. Although three pulses are shown, any number of pulses may be used to explicitly issue a control signal. For example, zero pulses in the active window 308 may represent a Keep Alive message to prevent the device from entering Suspend. A single pulse in the active window 308 may represent a Reset issuance, which would put the device in a default unconfigured state. Furthermore, two pulses in the active window 308 may indicate an explicit control message to instruct the device to power down, and enter Suspend or Sleep mode.

In embodiments, after the active window 308 has closed, the downstream port may send an end-of-packet (EOP) signal to signify that the control message has ended. The EOP may be a fixed period of time in which the data line eD+ 302 is at logic '1' while the data line eD− 304 is at logic '0'.

It is to be understood that the diagram shown in FIG. 3 is not the only embodiment of an encoded explicit control message. The encoding protocol of the control message does not necessarily have to match the embodiment described herein.

Figure 4:
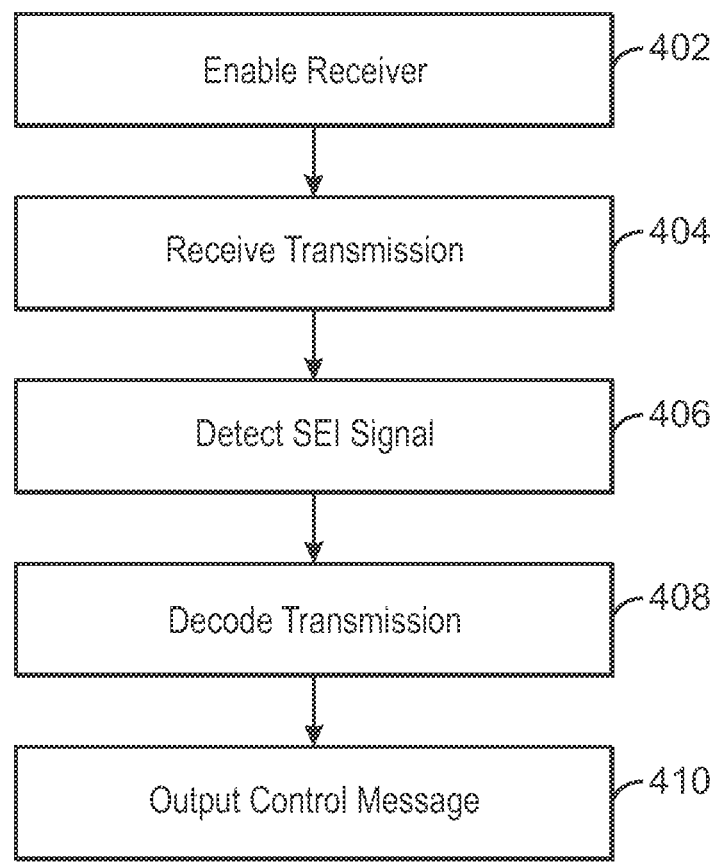
FIG. 4 is a process flow diagram illustrating a method to receive an explicit control message.

FIG. 4 is a process flow diagram illustrating a method to receive an explicit control message. The method 400 is performed by the upstream port of a device that is linked to the downstream port of a host.

At block 402, the upstream port enables its SE1 receiver. This may occur when the link is in the squelch state.

At block 404, the upstream port receives a transmission. The transmission may be sent from the downstream port through a pair of data lines eD+ and eD−. Additionally, the transmission may include an SE1 signal, an active window with a control message encoded, and an EOP.

At block 406, the SE1 signal is identified by an SE1 detector in the upstream port. This allows the upstream port to recognize the transmission as an explicit control message. The transmission is forwarded to a control message encoder. Also as a result of SE1 detection, the analog squelch detector and the analog transceiver are disabled.

At block 408, the control message encoder decrypts the message. More specifically, the control message encoder reads the number of pulses occurring in the active window of the transmission. In some embodiments, the number of signal pulses in the active window indicates the type of control message being sent. Additionally, in embodiments, the duration of time of the pulse may indicate the type of control message being sent.

At block 410, the upstream port delivers the control message to the device to be performed.

Although some embodiments have been described in reference to particular implementations, other implementations are possible according to some embodiments. Additionally, the arrangement or order of circuit elements or other features illustrated in the drawings or described herein need not be arranged in the particular way illustrated and described. Many other arrangements are possible according to some embodiments.

In each system shown in a figure, the elements in some cases may each have a same reference number or a different reference number to suggest that the elements represented could be different or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A method for explicit control message signaling, comprising:
    sending, from a Universal Serial Bus (USB) device, a single ended 1 signal on each one of a pair of data lines, wherein the pair of data lines includes a first data line and a second data line;
    after sending the single ended 1 signal, driving a voltage of the first data line to a logic 1 to define an active window; and
    during the active window, pulsing the voltage of the second data line between a logic 1 and a logic 0, wherein the number of pulses occurring within the active window indicates a type of control message.

2. The method of claim 1, wherein the voltage of the first data line is driven to a logic 1 for a fixed length of time.

3. The method of claim 1, wherein an end of packet pulse signifies an end of the control message.

4. The method of claim 2, wherein the method is performed for entry to a link power management state and for exit from a link power management state.

5. The method of claim 1, wherein previous link states or other conditions are not considered in order to determine the control message.

6. The method of claim 5, wherein the control messages are consumed by a repeater.

7. A universal serial bus device, comprising:
    a pair of data lines, wherein the pair of data lines includes a first data line and a second data line;
    a control message decoder; and
    a single ended signal detector to detect a logical high signal on the pair of data lines and send an alert to the control message decoder in response to the logical high signal;
    wherein, after receiving the alert, the control message decoder is to receive, on the first data line, a signal that defines an active window, and receive, on the second data line, a control message comprising a number of pulses, wherein the number of pulses to occur within the active window is to indicate a type of the control message.

8. The universal serial bus device of claim 7, wherein the control message decoder uses a duration of time of a pulse to indicate the type of control message being sent.

9. The universal serial bus device of claim 7, wherein the voltage of the first data line is driven to a logic 1 for a fixed length of time.

10. The universal serial bus device of claim 7, wherein an end of packet pulse signifies the end of the control message.

11. The universal serial bus device of claim 7, comprising a repeater, wherein the repeater consumes a control message from the control message decoder.

12. A computing device comprising:
    a pair of data lines configured for differential signaling, wherein the pair of data lines includes a first data line and a second data line;
    a control message decoder to receive and decode a link state control message, wherein the control message decoder is to receive a signal on the first data line that defines an active window, and is to receive a pulsed control signal comprising a number of pulses on the second data line, wherein the link state control message is to be decoded based on the number of pulses that occur during the active window.

13. The computing device of claim 12, wherein a number of pulses indicates to the control message decoder the type of control message being sent.

14. The computing device of claim 12, wherein the control message decoder uses a duration of time of a pulse to indicates the type of control message being sent.

15. The computing device of claim 12, wherein the voltage of the first data line is driven to a logic 1 for a fixed length of time.

16. The computing device of claim 12, wherein an end of packet pulse signifies the end of the control message.

* * * * *